(12) United States Patent
Oblizajek et al.

(10) Patent No.: US 10,407,093 B2
(45) Date of Patent: Sep. 10, 2019

(54) ELECTRIC POWER STEERING SYSTEMS AND METHODS

(71) Applicant: GM GLOBAL TECHNOLOGY OPERATIONS LLC, Detroit, MI (US)

(72) Inventors: Kenneth L. Oblizajek, Troy, MI (US); John D. Sopoci, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 15/674,063

(22) Filed: Aug. 10, 2017

(65) Prior Publication Data

US 2019/0047617 A1 Feb. 14, 2019

(51) Int. Cl.
*B62D 6/00* (2006.01)
*B62D 5/00* (2006.01)
*B62D 5/04* (2006.01)

(52) U.S. Cl.
CPC ............ *B62D 6/008* (2013.01); *B62D 5/006* (2013.01); *B62D 5/0463* (2013.01); *B62D 5/0472* (2013.01)

(58) Field of Classification Search
USPC .......................................................... 701/42
See application file for complete search history.

(56) References Cited

U.S. PATENT DOCUMENTS

| 6,687,588 | B2* | 2/2004 | Demerly | B62D 5/001 180/402 |
|---|---|---|---|---|
| 8,571,759 | B2 | 10/2013 | Oblizajek et al. | |
| 8,645,097 | B2 | 2/2014 | Oblizajek et al. | |
| 9,440,674 | B2 | 9/2016 | Oblizajek et al. | |
| 2009/0200099 | A1* | 8/2009 | Wong | B62D 5/0463 180/446 |
| 2015/0191200 | A1* | 7/2015 | Tsubaki | B62D 15/0285 701/42 |
| 2015/0210310 | A1* | 7/2015 | Akatsuka | B62D 5/04 701/41 |
| 2016/0325780 | A1* | 11/2016 | She | B62D 5/0472 |
| 2017/0327144 | A1* | 11/2017 | Sakaguchi | B62D 6/00 |

* cited by examiner

*Primary Examiner* — Tyler D Paige
(74) *Attorney, Agent, or Firm* — Lorenz & Kopf, LLP

(57) ABSTRACT

An electric power steering (EPS) system and methods to attenuate disturbances at the steering wheel by providing a feed forward motor drive input. The EPS includes an electric motor configured to provide a motor drive output responsive to a motor drive input, and an electronic control unit (ECU) being configured to provide the motor drive input, with at least one motor drive component of the motor drive input including compensatory periodic disturbance data. The ECU is further configured to provide disturbance attenuation with the at least one motor drive component from a road wheel signal and vibratory characteristics of a disturbance signal affecting the steering system.

19 Claims, 5 Drawing Sheets

ELECTRIC POWER STEERING SYSTEMS AND METHODS

TECHNICAL FIELD

The present disclosure generally relates to the field of vehicles and, more specifically, to methods and systems for controlling steering in vehicles having electric power steering systems.

BACKGROUND

Many vehicles today have electric power steering systems. Electric power steering (EPS) systems typically use an electric motor to provide a steering assist to a driver of the vehicle, thereby reducing effort by the driver in steering the vehicle.

Smooth Road Shake (SRS) is one type of objectionable vibratory response possible within an EPS leading to customer complaints. SRS is caused by internal periodic excitation such as tire/wheel imbalance, tire irregularities, brake rotor imbalance and lack of precision piloting of the rotating members. SRS typically occurs over a band of frequencies extending from 8 to 22 Hz, which depend on vehicle speed but occur typically in a range from about 72-145 kilometers-per-hour (kph) (approximately 45-90 miles-per-hour (mph)).

The presence of the mechanical torsional vibrations originating in the periodic excitation by the corners, i.e., the steerable or non-steerable wheel assemblies and related suspension and brake components at the corners of the vehicle, at lower orders of tire rotation, i.e., SRS, without any intervention by the EPS motor can result in a degradation in the perception of the steering response. Although not influencing the operation of the vehicle, these perceptible nuances can be large enough to convey a degree of dissatisfaction with the feel of the steering system as the steering wheel is rotated during mild steering maneuvers.

In certain vehicles equipped with EPS it is possible to actively attenuate via feedback control arrangements relatively narrowband torsional vibrations that are typical of SRS. This is generally accomplished using either proportional or integral feedback control arrangements or combinations thereof. Feedback control may have slow response following transient vehicle maneuvers: starting from a stopped condition, reversing, rapidly changing vehicle speed, etc. The response of a feedback control scheme can be improved by increasing control gain, but large gain introduces instability. Feed forward control offers faster response with a higher degree of fidelity and without the stability issues of feedback control. Nonetheless, these control arrangements have not seen implementation because of the unavailability of necessary data.

Accordingly, it is desirable to provide EPS systems and methods providing enhanced steering perception in vehicles, for example that provide an improved feel for the steering system during vibratory conditions such as occur with SRS attenuation in an EPS, through feed forward control arrangements. It is also desirable to provide program products and systems for improved steering perception in vehicles, for example that provide an improved feel for the steering system during vibratory conditions such as occur with SRS attenuation in an EPS, through feed forward control arrangements. Furthermore, other desirable features and characteristics of the present disclosure will be apparent from the subsequent detailed description and the appended claims, taken in conjunction with the accompanying drawings and the foregoing technical field and background.

BRIEF SUMMARY

In accordance with an exemplary embodiment, an electric power steering (EPS) system coupled to a steering wheel of a vehicle includes an electric motor configured to provide a motor drive output responsive to a motor drive input, and an electronic control unit (ECU) being configured to provide the motor drive input, with at least one motor drive component of the motor drive input including compensatory periodic disturbance data, the ECU is configured to provide disturbance attenuation with the at least one motor drive component from a road wheel signal and vibratory characteristics of a disturbance signal affecting the steering system. The at least one motor drive component of the motor drive input is configured as a feed forward motor drive component such that disturbances at the steering wheel are attenuated.

In accordance with an exemplary embodiment, an electric power steering (EPS) system coupled to a steering wheel of a vehicle includes an electric motor configured to provide a motor drive output responsive to a motor drive input, and an electronic control unit (ECU) being configured to provide the motor drive input, with at least one motor drive component of the motor drive input including compensatory periodic disturbance data, the ECU is configured to provide disturbance attenuation with the at least one motor drive component from a road wheel signal and vibratory characteristics of a disturbance signal affecting the steering system. The at least one motor drive component of the motor drive input is configured as a feed forward motor drive component such that disturbances at the steering wheel are attenuated. The compensatory periodic disturbance data is at least one of compensatory strictly periodic disturbance data and compensatory quasi-periodic disturbance data.

In accordance with an exemplary embodiment, an electric power steering (EPS) system coupled to a steering wheel of a vehicle includes an electric motor configured to provide a motor drive output responsive to a motor drive input, and an electronic control unit (ECU) being configured to provide the motor drive input, with at least one motor drive component of the motor drive input including compensatory periodic disturbance data, the ECU is configured to provide disturbance attenuation with the at least one motor drive component from a road wheel signal and vibratory characteristics of a disturbance signal affecting the steering system. The at least one motor drive component of the motor drive input is configured as a feed forward motor drive component such that disturbances at the steering wheel are attenuated. The road wheel signal is at least one of a transformed signal from an actual road wheel and a constructed surrogate transformed signal of at least one road wheel.

In accordance with an exemplary embodiment, an electric power steering (EPS) system coupled to a steering wheel of a vehicle includes an electric motor configured to provide a motor drive output responsive to a motor drive input, and an electronic control unit (ECU) being configured to provide the motor drive input, with at least one motor drive component of the motor drive input including compensatory periodic disturbance data, the ECU is configured to provide disturbance attenuation with the at least one motor drive component from a road wheel signal and vibratory characteristics of a disturbance signal affecting the steering system. The at least one motor drive component of the motor drive input is configured as a feed forward motor drive component such that disturbances at the steering wheel are attenuated.

The road wheel signal is at least one of a transformed signal from an actual road wheel and a constructed surrogate transformed signal of at least one road wheel. The transformed signal from an actual road wheel is a wheel angle position.

In accordance with an exemplary embodiment, an electric power steering (EPS) system coupled to a steering wheel of a vehicle includes an electric motor configured to provide a motor drive output responsive to a motor drive input, and an electronic control unit (ECU) being configured to provide the motor drive input, with at least one motor drive component of the motor drive input including compensatory periodic disturbance data, the ECU is configured to provide disturbance attenuation with the at least one motor drive component from a road wheel signal and vibratory characteristics of a disturbance signal affecting the steering system. The at least one motor drive component of the motor drive input is configured as a feed forward motor drive component such that disturbances at the steering wheel are attenuated. The road wheel signal is at least one of a transformed signal from an actual road wheel and a constructed surrogate transformed signal of at least one road wheel. The transformed signal from an actual road wheel is a wheel angle signal provided by a sensor.

In accordance with an exemplary embodiment, an electric power steering (EPS) system coupled to a steering wheel of a vehicle includes an electric motor configured to provide a motor drive output responsive to a motor drive input, and an electronic control unit (ECU) being configured to provide the motor drive input, with at least one motor drive component of the motor drive input including compensatory periodic disturbance data, the ECU is configured to provide disturbance attenuation with the at least one motor drive component from a road wheel signal and vibratory characteristics of a disturbance signal affecting the steering system. The at least one motor drive component of the motor drive input is configured as a feed forward motor drive component such that disturbances at the steering wheel are attenuated. The road wheel signal is at least one of a transformed signal from an actual road wheel and a constructed surrogate transformed signal of at least one road wheel. The transformed signal from an actual road wheel is a wheel angle signal provided by a 1 pulse per revolution (1 ppr) sensor.

In accordance with an exemplary embodiment, an electric power steering (EPS) system coupled to a steering wheel of a vehicle includes an electric motor configured to provide a motor drive output responsive to a motor drive input, and an electronic control unit (ECU) being configured to provide the motor drive input, with at least one motor drive component of the motor drive input including compensatory periodic disturbance data, the ECU is configured to provide disturbance attenuation with the at least one motor drive component from a road wheel signal and vibratory characteristics of a disturbance signal affecting the steering system. The at least one motor drive component of the motor drive input is configured as a feed forward motor drive component such that disturbances at the steering wheel are attenuated. The road wheel signal is at least one of a transformed signal from an actual road wheel and a constructed surrogate transformed signal of at least one road wheel. The constructed surrogate transformed signal of at least one road wheel is a constructed wheel angle position value.

In accordance with an exemplary embodiment, an electric power steering (EPS) system coupled to a steering wheel of a vehicle includes an electric motor configured to provide a motor drive output responsive to a motor drive input, and an electronic control unit (ECU) being configured to provide the motor drive input, with at least one motor drive component of the motor drive input including compensatory periodic disturbance data, the ECU is configured to provide disturbance attenuation with the at least one motor drive component from a road wheel signal and vibratory characteristics of a disturbance signal affecting the steering system. The at least one motor drive component of the motor drive input is configured as a feed forward motor drive component such that disturbances at the steering wheel are attenuated. The road wheel signal is at least one of a transformed signal from an actual road wheel and a constructed surrogate transformed signal of at least one road wheel. The constructed surrogate transformed signal of at least one road wheel is a periodic motion signal derived from rotation of the road wheel.

In accordance with an exemplary embodiment, an electric power steering (EPS) system coupled to a steering wheel of a vehicle includes an electric motor configured to provide a motor drive output responsive to a motor drive input, and an electronic control unit (ECU) being configured to provide the motor drive input, with at least one motor drive component of the motor drive input including compensatory periodic disturbance data, the ECU is configured to provide disturbance attenuation with the at least one motor drive component from a road wheel signal and vibratory characteristics of a disturbance signal affecting the steering system. The at least one motor drive component of the motor drive input is configured as a feed forward motor drive component such that disturbances at the steering wheel are attenuated. The road wheel signal is at least one of a transformed signal from an actual road wheel and a constructed surrogate transformed signal of at least one road wheel. The constructed surrogate transformed signal is a periodic signal derived from a steering wheel torque signal.

In accordance with an exemplary embodiment, an electric power steering (EPS) system coupled to a steering wheel of a vehicle includes an electric motor configured to provide a motor drive output responsive to a motor drive input, and an electronic control unit (ECU) being configured to provide the motor drive input, with at least one motor drive component of the motor drive input including compensatory periodic disturbance data, the ECU is configured to provide disturbance attenuation with the at least one motor drive component from a road wheel signal and vibratory characteristics of a disturbance signal affecting the steering system. The at least one motor drive component of the motor drive input is configured as a feed forward motor drive component such that disturbances at the steering wheel are attenuated. The EPS contains a sensor configured to provide an electrical torque signal to the ECU. The ECU is further configured to provide the motor drive signal including a feedback component based upon the electrical torque signal.

In accordance with an exemplary embodiment, a vehicle includes an electric power steering (EPS) system coupled to a steering wheel of a vehicle includes an electric motor configured to provide a motor drive output responsive to a motor drive input, and an electronic control unit (ECU) being configured to provide the motor drive input, with at least one motor drive component of the motor drive input including compensatory periodic disturbance data, the ECU is configured to provide disturbance attenuation with the at least one motor drive component from a road wheel signal and vibratory characteristics of a disturbance signal affecting the steering system. The at least one motor drive component of the motor drive input is configured as a feed forward motor drive component such that disturbances at the steering wheel are attenuated.

In accordance with a further exemplary embodiment, in a vehicle having an electric power steering (EPS) system coupled to a steering wheel of a vehicle, an electric motor configured to provide a motor drive output responsive to a motor drive input, and an electronic control unit (ECU), a method to provide the motor drive input with at least one motor drive component of the motor drive input includes obtaining a road wheel signal and vibratory characteristics of a disturbance signal affecting the steering system. The motor drive input is configured as a feed forward motor drive component including compensatory periodic disturbance data such that disturbances at the steering wheel are attenuated.

In accordance with a further exemplary embodiment, in a vehicle having an electric power steering (EPS) system coupled to a steering wheel of a vehicle, an electric motor configured to provide a motor drive output responsive to a motor drive input, and an electronic control unit (ECU), a method to provide the motor drive input with at least one motor drive component of the motor drive input includes obtaining a road wheel signal and vibratory characteristics of a disturbance signal affecting the steering system. The motor drive input is configured as a feed forward motor drive component including compensatory periodic disturbance data such that disturbances at the steering wheel are attenuated. The compensatory periodic disturbance data is at least one of compensatory strictly periodic disturbance data and compensatory quasi-periodic disturbance data.

In accordance with a further exemplary embodiment, in a vehicle having an electric power steering (EPS) system coupled to a steering wheel of a vehicle, an electric motor configured to provide a motor drive output responsive to a motor drive input, and an electronic control unit (ECU), a method to provide the motor drive input with at least one motor drive component of the motor drive input includes obtaining a road wheel signal and vibratory characteristics of a disturbance signal affecting the steering system. The motor drive input is configured as a feed forward motor drive component including compensatory periodic disturbance data such that disturbances at the steering wheel are attenuated. The road wheel signal is at least one of a transformed signal from an actual road wheel and a constructed surrogate transformed signal of at least one road wheel.

In accordance with a further exemplary embodiment, in a vehicle having an electric power steering (EPS) system coupled to a steering wheel of a vehicle, an electric motor configured to provide a motor drive output responsive to a motor drive input, and an electronic control unit (ECU), a method to provide the motor drive input with at least one motor drive component of the motor drive input includes obtaining a road wheel signal and vibratory characteristics of a disturbance signal affecting the steering system. The motor drive input is configured as a feed forward motor drive component including compensatory periodic disturbance data such that disturbances at the steering wheel are attenuated. The road wheel signal is at least one of a transformed signal from an actual road wheel and a constructed surrogate transformed signal of at least one road wheel. The transformed signal from an actual road wheel is a wheel angle position.

In accordance with a further exemplary embodiment, in a vehicle having an electric power steering (EPS) system coupled to a steering wheel of a vehicle, an electric motor configured to provide a motor drive output responsive to a motor drive input, and an electronic control unit (ECU), a method to provide the motor drive input with at least one motor drive component of the motor drive input includes obtaining a road wheel signal and vibratory characteristics of a disturbance signal affecting the steering system. The motor drive input is configured as a feed forward motor drive component including compensatory periodic disturbance data such that disturbances at the steering wheel are attenuated. The road wheel signal is at least one of a transformed signal from an actual road wheel and a constructed surrogate transformed signal of at least one road wheel. A sensor is configured to provide the transformed signal.

In accordance with a further exemplary embodiment, in a vehicle having an electric power steering (EPS) system coupled to a steering wheel of a vehicle, an electric motor configured to provide a motor drive output responsive to a motor drive input, and an electronic control unit (ECU), a method to provide the motor drive input with at least one motor drive component of the motor drive input includes obtaining a road wheel signal and vibratory characteristics of a disturbance signal affecting the steering system. The motor drive input is configured as a feed forward motor drive component including compensatory periodic disturbance data such that disturbances at the steering wheel are attenuated. The road wheel signal is at least one of a transformed signal from an actual road wheel and a constructed surrogate transformed signal of at least one road wheel. A 1 pulse per revolution (1 PPR) angular position sensor is configured to provide the transformed signal.

In accordance with a further exemplary embodiment, in a vehicle having an electric power steering (EPS) system coupled to a steering wheel of a vehicle, an electric motor configured to provide a motor drive output responsive to a motor drive input, and an electronic control unit (ECU), a method to provide the motor drive input with at least one motor drive component of the motor drive input includes obtaining a road wheel signal and vibratory characteristics of a disturbance signal affecting the steering system. The motor drive input is configured as a feed forward motor drive component including compensatory periodic disturbance data such that disturbances at the steering wheel are attenuated. The road wheel signal is at least one of a transformed signal from an actual road wheel and a constructed surrogate transformed signal of at least one road wheel. The constructed surrogate transformed signal of at least one road wheel is a constructed wheel angle position value.

In accordance with a further exemplary embodiment, in a vehicle having an electric power steering (EPS) system coupled to a steering wheel of a vehicle, an electric motor configured to provide a motor drive output responsive to a motor drive input, and an electronic control unit (ECU), a method to provide the motor drive input with at least one motor drive component of the motor drive input includes obtaining a road wheel signal and vibratory characteristics of a disturbance signal affecting the steering system. The motor drive input is configured as a feed forward motor drive component including compensatory periodic disturbance data such that disturbances at the steering wheel are attenuated. The road wheel signal is at least one of a transformed signal from an actual road wheel and a constructed surrogate transformed signal of at least one road wheel. The constructed surrogate transformed signal is a period motion signal derived from rotation of the road wheel.

In accordance with a further exemplary embodiment, in a vehicle having an electric power steering (EPS) system coupled to a steering wheel of a vehicle, an electric motor configured to provide a motor drive output responsive to a motor drive input, and an electronic control unit (ECU), a method to provide the motor drive input with at least one motor drive component of the motor drive input includes obtaining a road wheel signal and vibratory characteristics of a disturbance signal affecting the steering system. The motor drive input is configured as a feed forward motor drive component including compensatory periodic disturbance data such that disturbances at the steering wheel are attenuated. The road wheel signal is at least one of a transformed signal from an actual road wheel and a constructed surrogate transformed signal of at least one road wheel. The constructed surrogate transformed signal is a periodic signal derived from a steering wheel torque signal.

In accordance with a further exemplary embodiment, in a vehicle having an electric power steering (EPS) system coupled to a steering wheel of a vehicle, an electric motor configured to provide a motor drive output responsive to a motor drive input, and an electronic control unit (ECU), a method to provide the motor drive input with at least one motor drive component of the motor drive input includes obtaining a road wheel signal and vibratory characteristics of a disturbance signal affecting the steering system. The motor drive input is configured as a feed forward motor drive component including compensatory periodic disturbance data such that disturbances at the steering wheel are attenuated. The road wheel signal is at least one of a transformed signal from an actual road wheel and a constructed surrogate transformed signal of at least one road wheel. The method further includes providing a feedback component based upon the electrical torque signal.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature, and is not intended to limit the disclosure or the application and uses of the disclosure. Furthermore, there is no intention to be bound by any expressed or implied theory presented in the preceding technical field, background, brief summary or the following detailed description.

Figure 1:
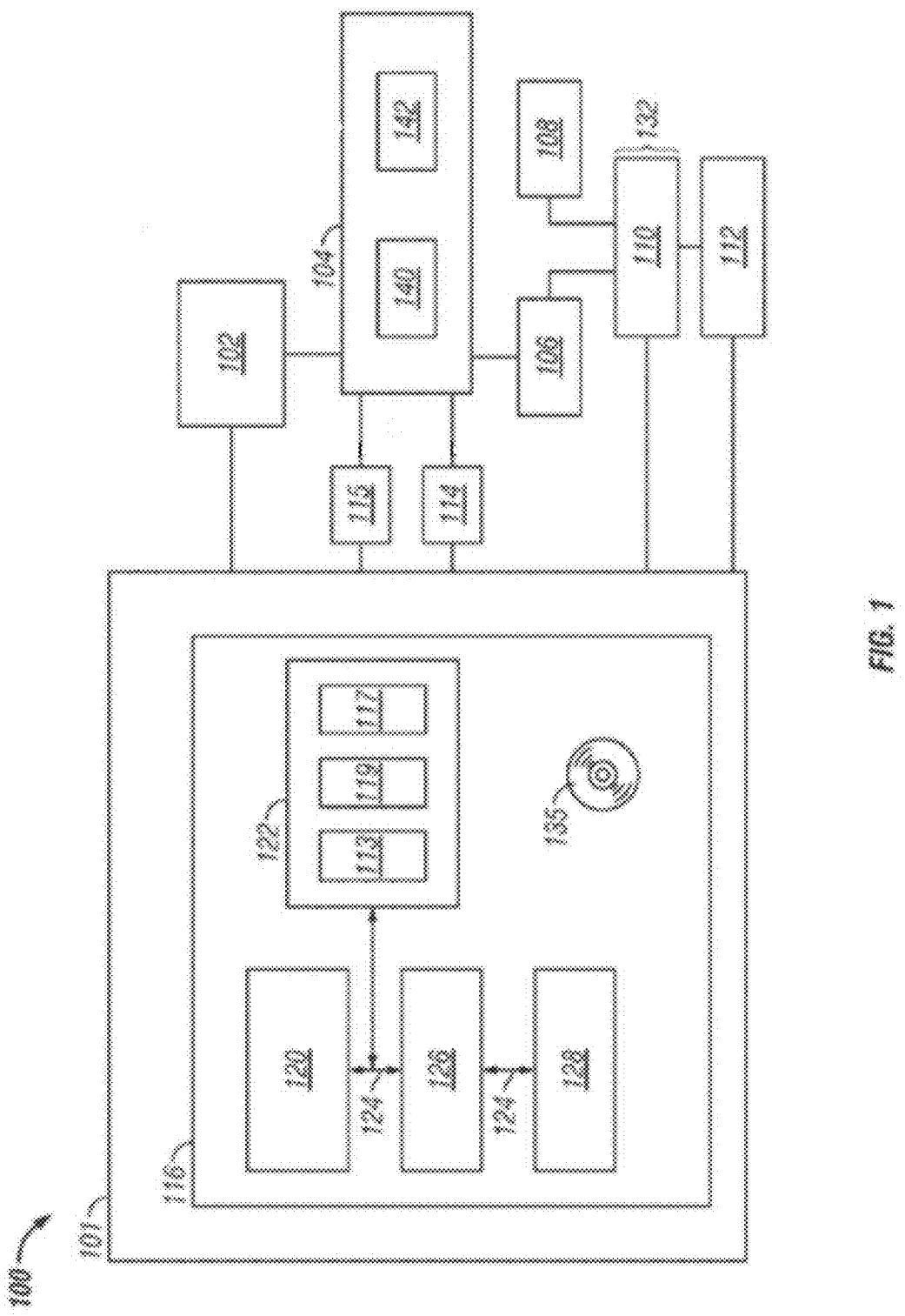
FIG. 1 is a functional block diagram of a system for controlling steering in a vehicle, in accordance with an exemplary embodiment.

FIG. 1 is a functional block diagram showing a system 100 for controlling steering in a vehicle. The vehicle includes a motor 102, a steering system 104, and a plurality of road wheels 106 and 108. In certain embodiments, the vehicle may be an automobile such as a sedan, a truck, a van, a sport utility, a cross-over vehicle, or another type of automobile. However, the system 100 can be used in connection with any number of types of vehicles.

The steering system 104 includes a steering column 140 and a steering wheel 142. In various embodiments, the steering system 104 further includes various other conventional features (not depicted in FIG. 1), such as a steering gear, intermediate connecting shafts between the column and the gear, connection joints, either flexible or rigid, allowing desired articulation angles between the intermediate connecting shafts, and tie-rods. The steering gear, in turn, may be a rack, input shaft, and internal gearing.

Specifically, the motor 102 is coupled to the steering system 104, and provides torque or force to a rotatable or translational member of the steering system 104. The motor 102 can be coupled to the rotatable shaft of the steering column or to the rack of the steering gear. In the case of a rotary motor, the motor 102 is typically connected through a geared or belt-driven configuration enabling a favorable ratio of motor shaft rotation to either column shaft rotation or rack linear movement. The steering system 104 in turn influences the steerable road wheels 106 during steering based upon the assist torque received from the motor 102 along with any torque received from a driver of the vehicle.

The system 100 includes an electric power steering (EPS) controller 101 that controls steering for the vehicle. The controller 101 is connected to the motor 102, the steering system 104, and one or more of the steerable road wheels 106 indirectly coupled thereto. The controller 101 may further communicate with or receive information from one or more other vehicle modules 112 (such as an anti-lock braking system, by way of example), as appropriate. The controller 101 attenuates smooth road shake (SRS) in the vehicle by employing control algorithms that typically feature feed forward control of motor drive torques opposing the torsional vibrations introduced during conditions when SRS is present or likely to be present (for example, when the vehicle velocity is proximate to predetermined speeds). The controller 101 further influences steering perception in a manner that provides for improved feel of the steering wheel 142 for the driver in situations in which smooth road shake (SRS) is being attenuated, preferably by controlling torque for the motor 102.

The controller 101 further includes or is coupled to the motor 102, sensors 132 and/or other vehicle components, such as those depicted in FIG. 1 among other actuators and sensors present within the vehicle. The controller 101 directs operation of the motor 102 to modify the steering effort in the steering wheel 142 during various conditions in which smooth road shake is likely to be experienced.

The torque sensor 114 (or other sensor or sensors for obtaining the torque signal) is coupled to the steering system 104. The torque sensor 114 measures a torque of the steering wheel 142 both when the steering wheel 142 is being dithered and when the steering wheel 142 is not being dithered and provides signals, or information representative thereof, to the controller 101 for processing. Preferably, the torque sensor 114 generates an electronic torque signal proportional to the static and dynamic mechanical torque in one of the shafts connecting the steering wheel to the steering gear and provides the electronic torque signal to the controller 101. The torque sensor 114 is preferably disposed within the steering system 104.

The steer angle sensor 115 measures a steering angle of the steering wheel 142 both when the steering wheel 142 is being dithered and when the steering wheel 142 is not being dithered and provides signals or information representative thereof to the controller 101 for processing. Preferably, the steer angle sensor 115 generates an electronic steering angle signal representing a steering angle of the steering wheel 142 and provides the electronic steering signal to the controller 101. The steer angle sensor 115 is disposed within the steering system 104, preferably on the steering column 140.

The wheel speed sensors 110 measure speeds of the wheels 106, 108 and provide signals or information representative thereof to the controller 101 for processing. In certain embodiments, the wheel speed sensors 110 are coupled to one or more of the plurality of road wheels 106 and 108, and can be part of the controller 101. However, in various other embodiments, different speed sensors 110 and/or devices may be used (e.g., a driveline rotary shaft speed sensor, and/or one or more other different types of sensors), which may belong to the controller 101 or alternatively another module 112 of the vehicle, such as an ABS (anti-lock braking system) module.

Also as depicted in FIG. 1, the controller 101 may include a computer system 116. The computer system 116 includes a processor 120, a memory 122, a computer bus 124, an interface 126, and a storage device 128. The processor 120 performs the computation and control functions of the computer system 116 or portions thereof, and may include any type of processor or multiple processors, single integrated circuits such as a microprocessor, or any suitable number of integrated circuit devices and/or circuit boards working in cooperation to accomplish the functions of a processing unit. During operation, the processor 120 executes one or more programs 113 that may be stored within the memory 122 and, as such, controls the general operation of the computer system 116, and the controller 101 in general.

As referenced above, the memory 122 stores a program or programs 113 that execute one or more embodiments or control schemes, such as the control scheme 200 described below in connection with FIG. 2 and/or various other control schemes or processes or combinations thereof, such as those described elsewhere herein. In the depicted embodiment, the memory 122 also stores a plurality of value parameters and related information 119, and one or more data structures 117 for use in processing the current measure of the torque signal and steering angle or information pertaining thereto, the wheel speed(s) or information pertaining thereto and the wheel position(s) or information pertaining thereto for use in controlling and adjusting the motor drive torque.

The memory 122 can be any type of suitable memory. This would include the various types of dynamic random access memory (DRAM) such as SDRAM (synchronous dynamic access memory), the various types of static RAM (SRAM), and the various types of non-volatile memory (PROM (programmable read only memory), EPROM (erasable programmable read only memory), and flash. In certain examples, the memory 122 is located on and/or co-located on the same computer chip as the processor 120.

The computer bus 124 serves to transmit programs, data, status and other information or signals between the various components of the computer system 116 and the signals from other modules. The computer bus 124 can be any suitable physical or logical device or arrangement of connecting computer systems and components. This includes, but is not limited to, direct hard-wired connections, fiber optics, infrared and wireless bus technologies, a LAN (local area network) bus, a CAN (controller area network) bus and/or one or more other technologies and combinations thereof.

The interface 126 allows communication to the computer system 116, for example from a vehicle occupant, a system operator, and/or another computer system, and can be implemented using any suitable method and apparatus. In certain embodiments, the interface 126 at least facilitates providing the current measure of the torque signal or information pertaining thereto from the torque sensor 114, and/or the wheel speed or information pertaining thereto from the speed sensor(s) 110. The interface 126 can include one or more network interfaces to communicate within or to other systems or components, one or more terminal interfaces to communicate with technicians, and one or more storage interfaces to connect to storage apparatus such as the storage device 128.

The storage device 128 can be any suitable type of storage apparatus, including direct access storage devices such as solid-state memory devices, hard disk drives, flash systems, floppy disk drives and optical disk drives. In one exemplary embodiment, the storage device 128 may be a program product from which memory 122 can receive a program 113 that executes one or more embodiments of one or more processes of the present disclosure, such as the steps of the process 200 described further below in connection with FIG. 2. In another exemplary embodiment, the program product may be directly stored in and/or otherwise accessed by the memory 122 and/or a disk (e.g. disk 135), such as that referenced below.

It will be appreciated that while this exemplary embodiment is described in the context of a fully functioning computer system, those skilled in the art will recognize that the mechanisms of the present disclosure are capable of being distributed as a program product with one or more types of non-transitory computer-readable storage media and/or signal bearing media used to store the program and the instructions thereof and carry out the distribution thereof, such as a non-transitory computer readable medium bearing the program and containing computer instructions stored therein for causing a computer processor (such as the processor 120) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 116 may also otherwise differ from the embodiment depicted in FIG. 1, for example in that the computer system 116 may be coupled to or may otherwise utilize one or more remote computer systems and/or other control systems.

Figure 2:
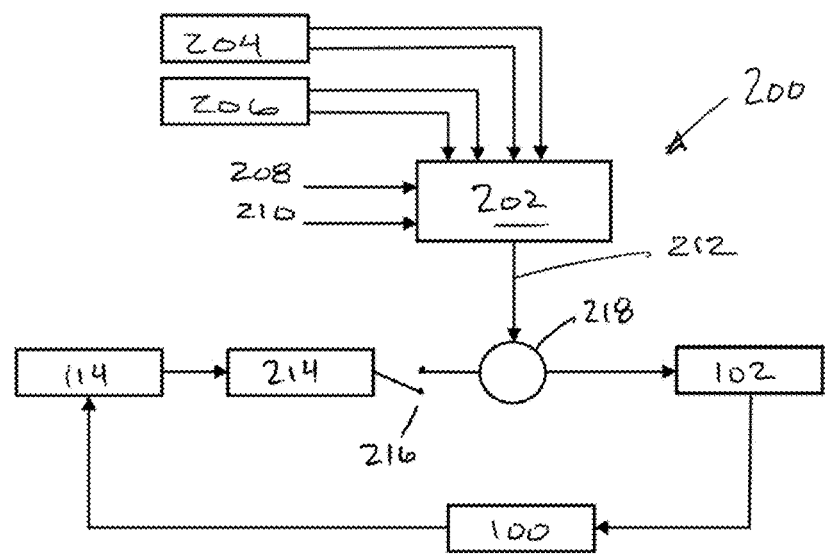
FIG. 2 is a functional block diagram of a control arrangement for controlling steering in a vehicle, in accordance with an exemplary embodiment.

FIG. 2 is a functional block diagram of a control arrangement or process 200 for attenuating unwanted steering vibrations in a vehicle, in accordance with an exemplary embodiment. Specifically, the process 200 improves the feel of the steering system of a vehicle by suppressing torsional vibration during periodic excitation of the suspension corners. In an exemplary embodiment, the process 200 can be implemented in connection with the system 100 of FIG. 1 and/or through program products that can be utilized in connection therewith. However, it will be appreciated that in various embodiments the process 200 may also be utilized in connection with any number of different types of systems and/or other devices.

As depicted in FIG. 2, the process 200 includes a feed forward controller 202. The feed forward controller 202 in exemplary embodiments may be disposed as all or a portion of the controller 101, and may furthermore be implemented as a program retained within memory 122 of the controller 101 and executed by the processor 120 of the controller 101.

In exemplary embodiments, the controller 202 is provided at least one-wheel disturbance data and at least one-wheel angle data. As shown in the exemplary embodiment depicted in FIG. 2, a first wheel disturbance data 204 associated with respective ones of the steerable road wheels 106 and a second wheel disturbance data 206 associated with the non-steerable wheels 108 are provided to the controller 202. Additionally, provided to the feed forward controller 202 are first wheel angle data 208 corresponding to an actual or a surrogate angular position of respective ones of the steerable road wheels 106 and second wheel angle data 210 corresponding to an actual or a surrogate angular position of the respective ones of the non-steerable road wheels 108. The disturbance data 204/206 and the wheel angle data 208/210 may be data provided by, derived or learned from data or signals received from various vehicle sensors, e.g., sensors 110 and 114, combinations of data from such sensors, a kinematic variable representing motion of the steering rack, such as translation of the steering rack or rotation of the steering shaft, or other such data or indications that may be correlated to a corner disturbance. In this regard, the disturbance data 204/206 represents data that is directly measured, representative or inferred, or combinations thereof of a contribution to vibration communicated to the steering wheel 142 from the respective wheel 106/108 for a given angular velocity and angular position of the wheel 106/108, which may be perceived within the steering wheel torque sensor 114. Provided with the disturbance data and wheel angle data the controller 202 is configured to provide a motor drive signal 212 containing compensatory disturbance data to the motor 102 that attenuates vibration communicated to the steering wheel 142, such as, but not limited to, vibration associated with smooth road shake (SRS).

The disturbance data 204/206 correlates a measurable value, e.g., wheel speed such as provided by sensors 110, into a vibration disturbance from each wheel, e.g., wheels 106 and 108, for a given wheel angle. Correlating measurable values to a disturbance phasor, the disturbance data 204/206 may be embodied as a collection of 1-dimensional lookup tables, where the disturbance data 204/206 may be 2-dimensional phasor data having a phase component and an amplitude component, which data may be stored within data structures 117. In alternative embodiments, the disturbance data 204/206 may be embodied as a collection of n-dimensional lookup tables from which 2-dimensional phasor data may be determined from n input variables.

Figure 3:
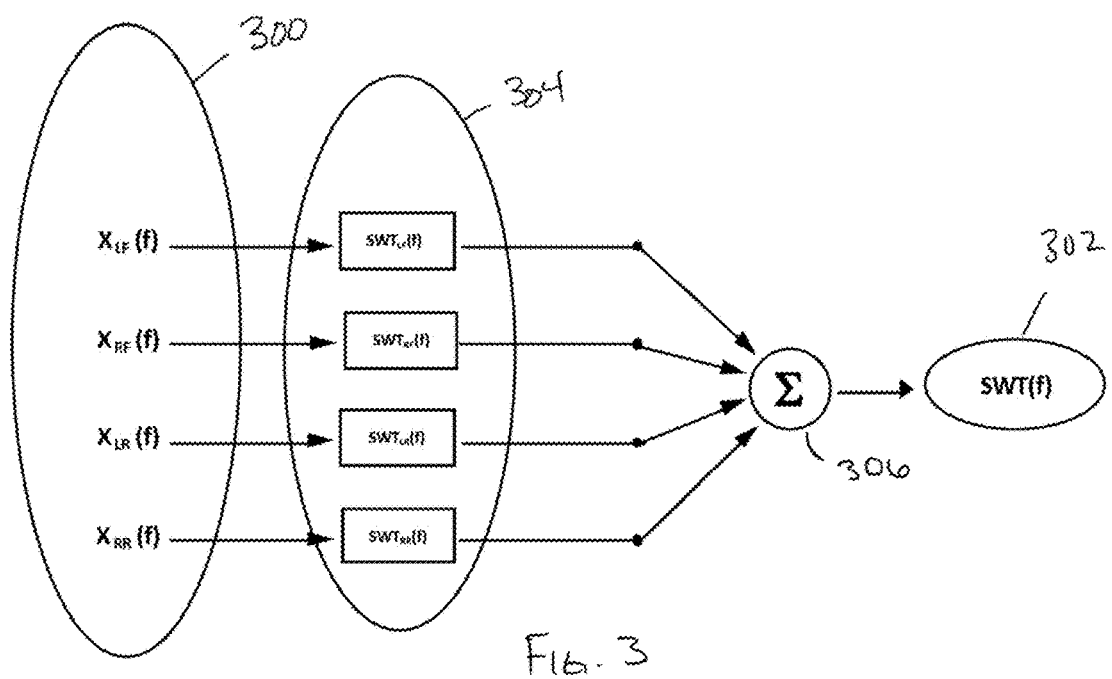
FIG. 3 is a graphic depicting a model for decomposing steering wheel torque vibration levels, in accordance with an exemplary embodiment.

FIG. 3 graphically depicts the relationship between corner values 300, such as measured or derived data, and the resulting total steering wheel torque (SWT) 302, i.e., the torque perceived at the steering wheel 142. As shown in FIG. 3, the corner values 300 (left front ($X_{LF}$), right front ($X_{RF}$), left rear ($X_{LR}$) and right rear ($X_{RR}$)) are data known or derived for each corner or wheel 106/108. The corner values are phasor values and represent at least relative wheel angle at each corner. The effect of each corner on the SWT 302 is in accordance with additional steering wheel torque phasor functions 304. As depicted, there is a corresponding steering wheel torque phasor function 304, e.g., $SWT_{LF}(f)$, $SWT_{RF}(f)$, $SWT_{RR}(f)$ and $SWT_{LR}(f)$, and the output of each function 304 is a phasor value having amplitude and phase components. The SWT 302 is a phasor value representing the combination (306) of the torque phasor functions 304 output. The result is from multiple inputs, i.e., corner values 300, a single output SWT 302 is obtained.

The steering wheel torque phasor functions 304 must be determined, which may be accomplished by any number of empirical methods. Once determined, the torque phasor functions 304 may be retained within the data structures 117 and/or related information data 119 of the controller 101. The relationship between a vector (y) of steering wheel torque values 302, a corresponding matrix (x) of corner values 300 and a vector (H) of steering wheel torque phasor functions 304 is given as:

$$\underbrace{\begin{bmatrix} SWT_1 \\ SWT_2 \\ SWT_3 \\ \vdots \\ SWT_N \end{bmatrix}}_{[y]} = \underbrace{\begin{bmatrix} X_{LF,1} & X_{RF,1} & X_{LR,1} & X_{RR,1} \\ X_{LF,2} & X_{RF,2} & X_{LR,2} & X_{RR,2} \\ X_{LF,3} & X_{RF,3} & X_{LR,3} & X_{RR,3} \\ \vdots & \vdots & \vdots & \vdots \\ X_{LF,N} & X_{RF,N} & X_{LR,N} & X_{RR,N} \end{bmatrix}}_{[x]} \underbrace{\begin{bmatrix} SWT_{LF} \\ SWT_{RF} \\ SWT_{LR} \\ SWT_{RR} \end{bmatrix}}_{[H]}$$

All values are phasor values, and the subscripts 1, 2, 3, ... N denote a time window sample number. The vector H is given as:

$$\underline{H} := S_{xx}^{-1} \cdot S_{xy}$$

Where:

$$S_{xx} := \overline{x}^T \cdot x$$

$$S_{xy} := \overline{x}^T \cdot y$$

matrix operations as follows:
superscript "T" represents transpose;
superscript "−1" represents inverse;
overline represents conjugate While the foregoing described embodiment of controller 200 and SWT phasor functions 304 contemplates the use of steering wheel torque phasor functions 304 corresponding to four road wheels, i.e., steerable road wheels 106 and non-steerable road wheels 108, additional embodiments may be limited to corner values 300 and SWT phasor functions 304 for the steerable road wheels only, e.g., wheels 106, as it is the steerable road wheels that are coupled to the steering wheel 142 and most greatly influence SWT 302 and objectionable SRS. Limiting SWT 302 determination to steerable road wheel influence only reduces data storage and processing burden.

Referring again to FIG. 2, the process 200 may optionally include a feedback controller 214 that may be selectively coupled to modify the motor drive signal 212 via a trimming switch 216. The feedback controller 214 may be a proportional, integral or combination type feedback controller. The feedback controller 214 receives a steering wheel torque value from the torque sensor 114, and wheel speed values from sensors 110 and provides a feedback trimming signal that is combined (218) with the motor drive signal 212 before being communicated to the motor 102.

The feedback controller 214 may supplement the feed forward controller 202, and particularly during periods of steady state operation when feedback control with low gain values is effective. The feedback control may further provide compensation, i.e., trimming, for changes that may occur in the vehicle and/or the system 100 over time that would not be reflected in the disturbance data 204/206 until there is a relearning or recalibration of the SWT functions 304. Use of the feedback control with the feed forward control has the advantage of reducing the frequency of relearning/recalibration of the SWT functions 304. Still further, the feedback controller 214 may be used to provide information to facilitate relearning, recalibration and updating of the SWT functions 304.

With respect to relearning, recalibration, update, resetting, etc. of the SWT phasor functions 304, such actions may be taken on an incremental basis, and based upon feedback information provided by the feedback controller 214. However, once a threshold number of incremental updates have been made, it may be desirable to perform a complete relearning of the SWT phasor functions 304. In another alternative embodiment, the relearning, recalibration, resetting, etc. may be accomplished on a set schedule of mileage or time.

As will be appreciated from the foregoing description of embodiments of a feed forward controller providing superior response, it is necessary to have actual or surrogate wheel angular velocity and wheel angular position data to be provided to the feed forward controller 202. Within virtually all vehicles, wheel angular velocity is readily available from one or more sensors, such as sensors 110, which may be a component of the vehicle anti-lock braking system or other vehicle system. Presently used wheel speed encoders, however, do not provide an absolute position value indicating an angular position of the wheel.

In one exemplary embodiment, it may be possible to modify typical wheel speed sensors to provide actual wheel angle data as a 1 pulse per revolution (1 ppr) position indication. In still another exemplary embodiment, it may be possible to create a surrogate wheel angle position data from observing small errors in the signal from a typical encoder. Such a technique is taught in the commonly owned U.S. Pat. No. 8,645,097, the disclosure of which is hereby expressly incorporated herein by reference.

Figure 4:
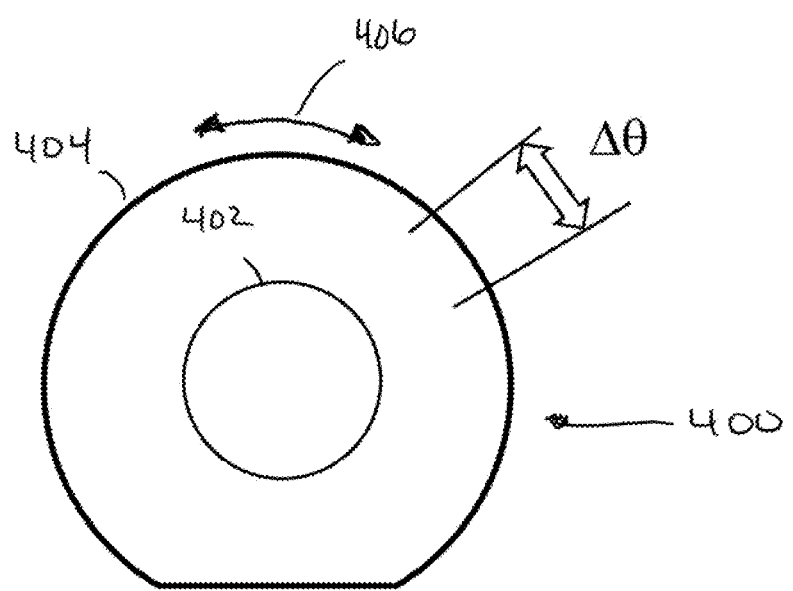
FIGS. 4 and 5 are graphic depictions of a wheel and corresponding angular motion variables for recovering a wheel angular position in accordance with an exemplary embodiment.
Figure 5:
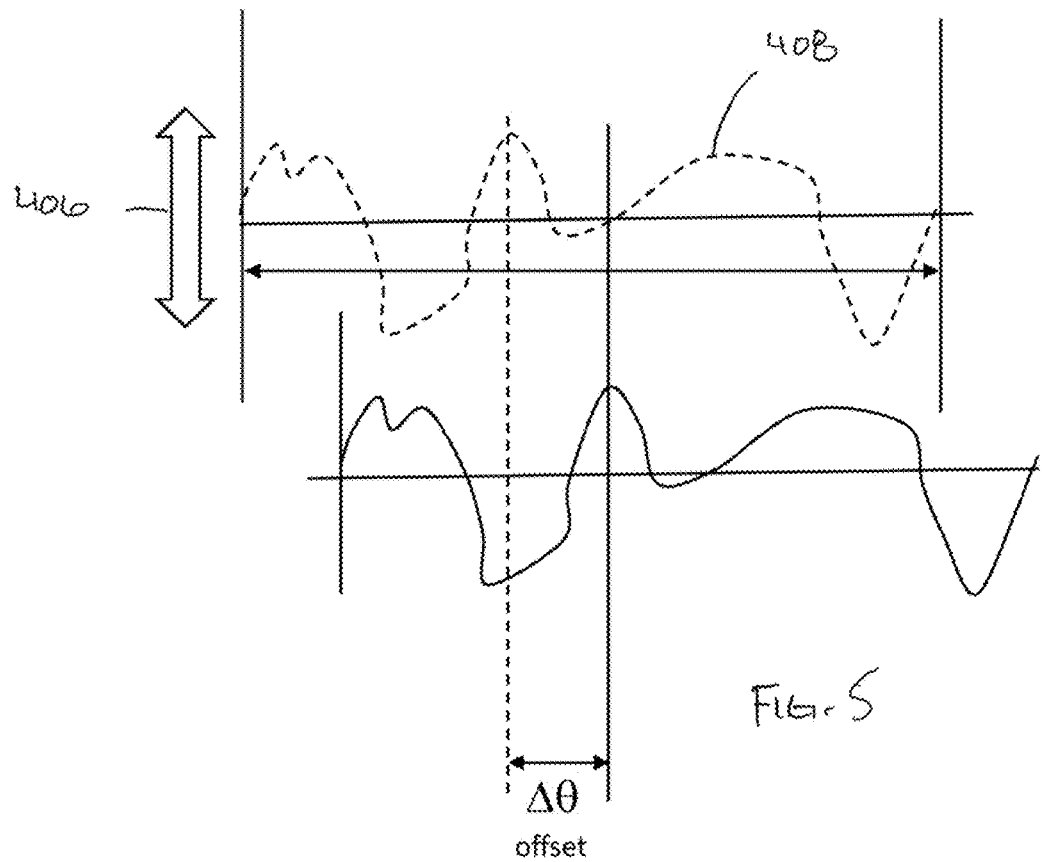

With reference to FIGS. 4 and 5, a wheel assembly 400 includes a rim 402 onto which is mounted a tire 404. One or more motion variables: angle, velocity, acceleration, and the like (generally indicated as 406) changes with time during a single revolution. Sensing these changes, for example changes in velocity via sensors 110, reveals a pattern 408 that repeats with each rotation of the wheel assembly 400. When there is a transient maneuver such as stopping and restarting, backing, rapidly changing velocity, the registration of the wheel, and hence the known absolute wheel angle may be lost. However, sensing the repeating pattern 408 as the wheel assembly 400 is caused to rotate, and aligning it with stored data representing the pattern makes it possible to register the angular position of the wheel. As shown in FIG. 4 as the vehicle completes the transient maneuver, e.g., restarting after stopping, an offset in degrees, $\Delta\theta$, can be determined. From the offset, it is possible to determine a surrogate wheel angular position data. Furthermore, the pattern 408 once established, can be updated or reestablished as the pattern changes with tire and vehicle wear.

Figure 6:
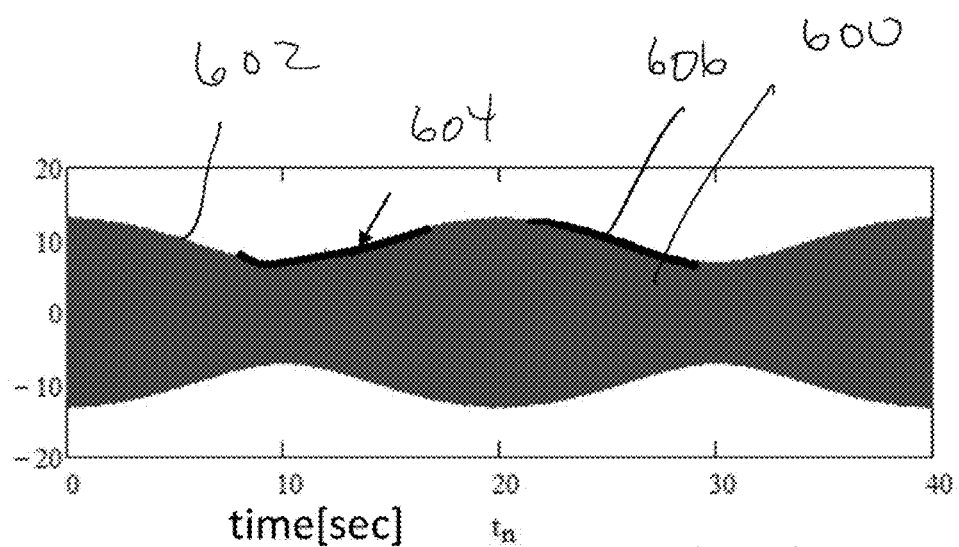
FIG. 6 is a graphic depicting a measured steering wheel torque composition, in accordance with an exemplary embodiment.

Referring to FIG. 6, as described in connection with various of the embodiments set out herein, there may be provided a torque sensor 114, and output of which is indicative of steering wheel torque (SWT). In another exemplary embodiment, it is possible to observe a disturbance signal present in an output of the SWT sensor 114 to develop a pattern from the SWT values from which wheel angular position may be determined. In accordance with this embodiment, the torque output of the sensor 114 is filtered, and periodically captured. Filtered and sampled output of the sensor 114 output may indicate a modulating sine wave 600 to render an envelope 602. In an exemplary embodiment, the carrier sine wave may have an approximate 15 hz frequency with a 20-40 second modulation period. If the signal-to-noise ratio of the torque sensor 114 output is low, averaging of the torque sensor 114 output may be used.

Figure 7:
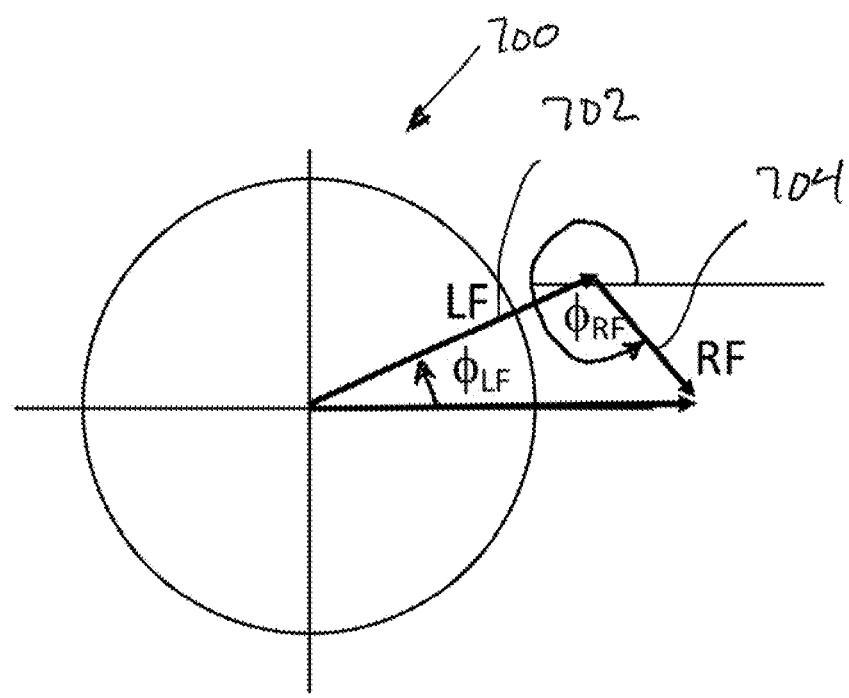
FIG. 7 is a graphic depiction of phasor contributions of first and second wheels to the measured steering wheel torque composition depicted in FIG. 4.

The torque peaks are determined as are the slope of the envelope 602, i.e., is the envelope increasing 604 or decreasing 606 at the angular position, discussed below. For a sampling period, in an exemplary embodiment four seconds (4s), the torque sensor 114 output is used to create a polar plot 700 (FIG. 7) consisting of a summation of a LF phasor 702 and a RF phasor 704. The respective magnitudes |LF| and |RF| of the vectors 702 and 704 are known and previously stored, e.g., within data structures 117 and/or related information structure 119. Wheel angular positions, $\varnothing_{LF}$ and $\varnothing_{RF}$, may be determined by solving the simultaneous equations:

$$|LF|\cdot\cos(\varphi_{LF})+|RF|\cdot\cos(\varphi_{RF})=|SWT|$$

$$|LF|\cdot\sin(\varphi_{LF})+|RF|\cdot\sin(\varphi_{RF})=0$$

Solving the forgoing equations, except at max and min conditions ($\varnothing=0$ and $\varnothing=180$), will yield two sets of angles for each of $\varnothing_{LF}$ and $\varnothing_{RF}$. From the time derivative of the envelope 602 at the angular positions, it can be determined if the signal is increasing 604 or decreasing 606, which determines which set of angles apply. These angles represent the reset or offset previously determined and stored within the data structures 117/information structure 119, and from which it is possible to determine the wheel angular position.

Similarly using the SWT sensor 114 output in accordance with the exemplary embodiment described above in connection with FIGS. 6 and 7, it is possible to observe a disturbance signal present in an output of the SWT sensor 114 output to develop a pattern from the SWT values from which wheel angular position may be determined. The output of the SWT sensor 114 is periodic repeating signal, and as such, will have a number of determinable harmonics.

For a given, nth, harmonic the SWT torque at the corners is given as:

$$SWT_{LF,n}=A_{LF,n}\sin(n(\theta-\theta_{LF,n}))$$

$$SWT_{RF,n}=A_{RF,n}\sin(n(\theta-\theta_{RF,n}))$$

$$SWT_{meas'd,n}=SWT_{LF,n}+SWT_{RF,n}$$

where LF is the left front corner, RF is the right front corner, A is the amplitude, and n is the order of harmonic.

While any number of harmonics may be used, in most implementations only the first and second, n=1 and n=2, will be required. The values of $A_{LF,\,n}$; $\theta_{LF,n}$ and $A_{RF,\,n}$; $\theta_{RF,n}$ are known from history and stored, e.g., in data structures 117. Solving the above equations, therefore, yields the reset or offset angle which is then stored within data structures 117, and from which it is possible to determine the updated wheel angular positions.

Any of the herein described exemplary embodiments of a feed forward control may furthermore incorporate feedback control, as described. It is possible to recover angular wheel position from observation of feedback characteristics. In such an implementation, the feedback characteristics themselves may reveal patterns that may be resolved to a wheel angular position. Observing feedback characteristic at low speed operation of the vehicle, e.g., below vehicle speed where SRS is prevalent, to gather data, resolve wheel angular position and store the data within the data structures 117 for use in feed forward control as vehicle speed enters the range in which SRS is prevalent.

Accordingly, improved methods, program products, and systems are provided for optimally controlling motor drive torque of an EPS within a vehicle. The improved methods, program products, and systems allow for smooth road shake to be better controlled based on dynamic inputs represented by measured, observed and determined values of wheel angular velocity, wheel angular position and steering wheel torque such that compensatory disturbance data may be derived to control the motor drive torque to attenuate vibration responses, and in particular, smooth road shake.

It will be appreciated that a number of exemplary embodiments have been described individually, and at times in combination. It will be appreciated that any number of the embodiments, or aspects thereof, may be combined. All may be combined with a form of feedback control. For example, at least the following exemplary embodiments for recovering wheel angular position and combinations thereof are contemplated as within the scope of this disclosure: 1 pulse per revolution (1 PPR) wheel sensor; recovery of wheel angular position based upon wheel speed sensor characteristics; recovery of wheel angular position based upon observation of disturbance envelope of SWT torque sensor output; recovery of wheel angular position based upon observation of n harmonics of SWT torque sensor output; recovery of wheel angular position from feedback control at speeds below SRS inducing speeds.

It will be appreciated that, in various embodiments, the disclosed methods, program products, and systems may vary from those depicted in the figures and described herein. It will similarly be appreciated that, while the disclosed methods, program products, and systems are described above as being used in connection with automobiles such as sedans, trucks, vans, sport utilities, and cross-over vehicles, the disclosed methods, program products, and systems may also be used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electric power steering (EPS) system coupled to a steering wheel of a vehicle, the EPS comprising:
an electric motor configured to provide a motor drive output responsive to a motor drive input, and
an electronic control unit (ECU) configured to provide the motor drive input, with at least one motor drive component of the motor drive input including compensatory periodic disturbance data, wherein
the ECU is configured to provide disturbance attenuation with the at least one motor drive component from a road wheel signal and vibratory characteristics of a disturbance signal affecting the steering system, and the at least one motor drive component of the motor drive input is configured as a feed forward motor drive component such that disturbances at the steering wheel are attenuated,
wherein the road wheel signal comprises a constructed surrogate transformed signal of at least one road wheel provided to the ECU, the ECU configured to be responsive to the constructed surrogate transformed signal to provide the motor drive input.

2. The EPS of claim 1, wherein the compensatory periodic disturbance data comprises at least one of compensatory strictly periodic disturbance data and compensatory quasi-periodic disturbance data.

3. The EPS of claim 1, wherein the road wheel signal further comprises an actual road wheel signal.

4. The EPS of claim 3, wherein the actual road wheel signal comprises a wheel angle position signal derived from a sensor detecting angular motion.

5. The EPS of claim 4, the sensor comprising a 1 pulse per revolution (1PPR) angular position sensor.

6. The EPS of claim 1, wherein the constructed surrogate transformed signal of at least one road wheel comprises a constructed wheel angle position value.

7. The EPS of claim 1, wherein the constructed surrogate transformed signal comprises a periodic motion signal derived from rotation of the road wheel.

8. The EPS of claim 1, wherein the constructed surrogate transformed signal comprises a periodic signal derived from a steering wheel torque signal.

9. The EPS of claim 1, wherein the constructed surrogate transformed signal comprises a vibratory characteristic of a disturbance signal present in a steering wheel torque sensor.

10. The EPS of claim 1, the EPS further comprising a sensor configured to provide an electrical torque signal to the ECU, the ECU being further configured to provide the motor drive signal comprising a feedback component based upon the electrical torque signal.

11. A vehicle comprising an EPS of claim 1.

12. In a vehicle having an electric power steering (EPS) system coupled to a steering wheel of a vehicle, an electric motor configured to provide a motor drive output responsive to a motor drive input, and an electronic control unit (ECU), a method to provide the motor drive input comprising:
constructing a surrogate transformed signal of at least one road wheel signal to provide a constructed surrogate transformed road wheel signal,
obtaining at least one vibratory characteristics of a disturbance signal affecting the steering system, and
configuring a component of the motor drive input as a feed forward motor drive component having as inputs and being responsive to the constructed surrogate transformed road wheel signal, the at least one vibratory characteristic and compensatory periodic disturbance data such that disturbances at the steering wheel are attenuated.

13. The method of claim 12, wherein the compensatory periodic disturbance data comprises at least one of compensatory strictly periodic disturbance data and compensatory quasi-periodic disturbance data.

14. The method of claim 12, further comprising obtaining a road wheel signal from an actual road wheel and providing the road wheel signal as an input to the feed forward motor drive component.

15. The method of claim 14, wherein the transformed signal from an actual road wheel comprises a wheel angle position derived from a sensor detecting angular motion.

16. The method of claim 15, wherein the sensor comprises a 1 pulse per revolution (1PPR) angular position sensor.

17. The method of claim 12, wherein the constructed surrogate transformed signal comprises a period motion signal derived from rotation of the road wheel.

18. The method of claim 12, wherein the constructed surrogate transformed signal comprises a periodic signal derived from a disturbance signal present in a steering wheel torque sensor.

19. The method of claim 12, further comprising providing a feedback component based upon an electrical torque signal.

\* \* \* \* \*